Figure 1:
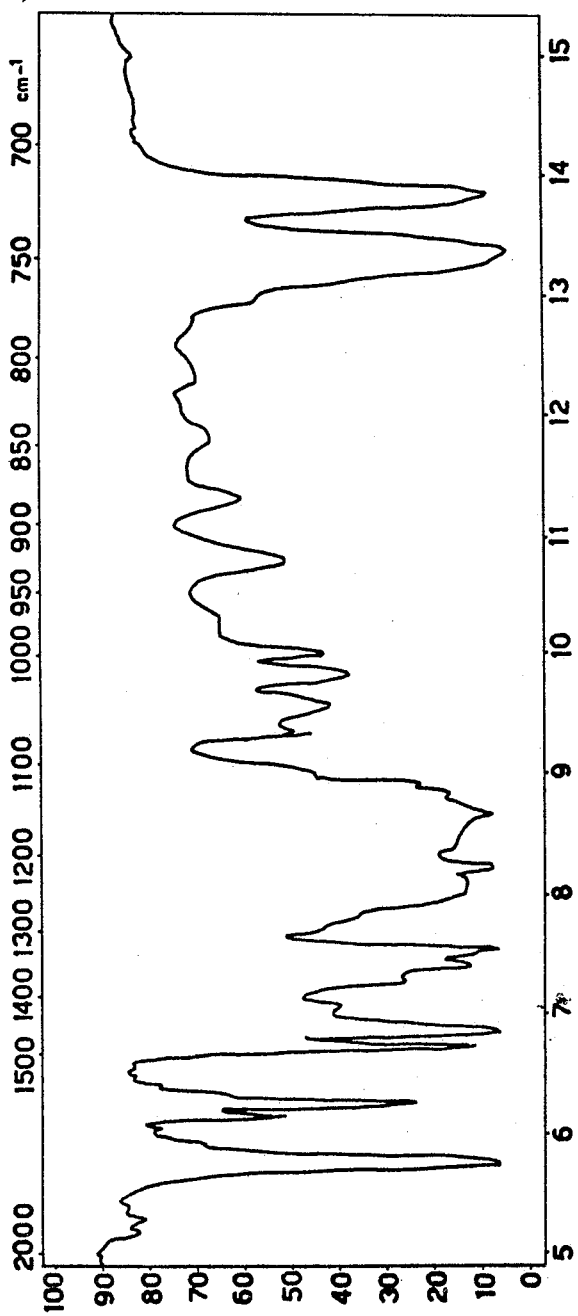

United States Patent Office 3,352,882
Patented Nov. 14, 1967

3,352,882
NOVEL CARBAZOLE DERIVATIVES
Cornelio Caldo and Salvatore Algieri, Terni, Italy, assignors to Montecatini Edison S.p.A., Milan, Italy, a corporation of Italy
Filed Sept. 11, 1962, Ser. No. 222,912
Claims priority, application Italy, Sept. 14, 1961, 16,548/61
1 Claim. (Cl. 260—315)

The present invention relates to the preparation of heterocyclic thioesters and to their use for the stabilization of polyolefins.

In U.S. patent application Serial No. 127,987, filed July 30, 1961, now U.S. Patent 3,236,805 the synthesis of thioesters having the formula:

R—C(O)—O—CH₂—CH₂—S—CH₂—CH₂—O—C(O)—R' wherein R and R' are aliphatic groups containing from 8 to 30 carbon atoms has been described. There is also described their use for the stabilization of crystalline polyolefins prepared in the presence of stereospecific catalysts.

In a copending patent application filed by the applicants this day, Serial No. 222,905, now U.S. Patent 3,244,669, issued April 5, 1966, the preparation of aromatic thioesters from thiodiglycol and aromatic oxyacids, and their use for the stabilization of polyolefins, are described.

We have now found that heterocyclic thioesters selected from the group consisting of thiodiglycol di-[β-(9-carbazolyl)propionate] and N-β-hydroxyethylcarbazol-thiodipropionate also exhibit a high stabilizing action for polyolefins against the action of heat, ageing and light, particularly such polyolefins as polypropylene obtained in the presence of certain stereospecific catalysts. Moreover, these compounds act as stabilizers for compositions containing polyolefins and a basic nitrogen compound (e.g., polyalkyleneimines, condensation products of dichloroethane with polyfunctional amines, condensation products of epichlorohydrin with amines, polyvinylpyridine, etc.) which compositions give textile fibers having improved tinctorial characteristics.

The thioglycol of [β-(9-carbazolyl)propionate] can be obtained by reaction, in accordance with the procedure described in U.S. patent application Serial No. 127,987, filed July 30, 1961, now U.S. Patent 3,236,805 of one mole of thiodiethylene glycol and two moles of 9-carbazolylpropionic acid according to the following reaction:

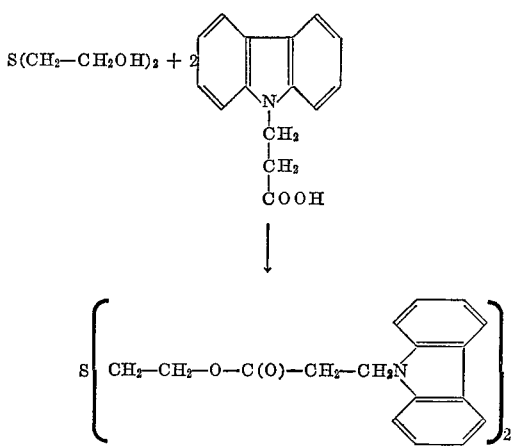

In a manner similar to that shown above, the isomer thiopropionate ester of 9-β-hydroxyethylcarbazole has been prepared by reaction of β,β'-thiodipropionic acid and 9-β-hydroxyethyl-carbazole:

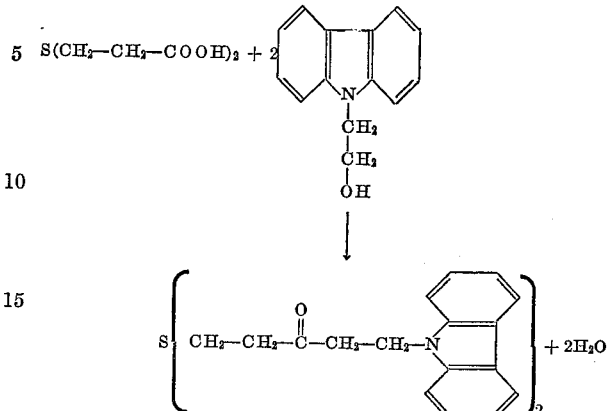

The preparation of the 9-carbazolylpropionic acid has been carried out by cyanoethylation of carbazole and then by saponification of the group —CN to —COOH.

The preparation of the 9-hydroxyethylcarbazole has been carried out by reacting carbazole with ethylene oxide.

The stabilizers of the present invention can be used alone or together with another stabilizer system such as a dialkylphenol sulfide, particularly 4,4'-thiobis-6-tert-butyl-metacresol, and an aliphatic thioester such as laurylthiodipropionate, dodecoylthiodiglycolate and similar substances. The stabilizers and/or the mixture having stabilizing action, of the present invention, are capable of stabilizing crystalline polyolefin compositions, which compositions can be colored by the addition of organic or inorganic dyeing pigments to the polymer/stabilizer mixture before extrusion thereof.

The amount of heterocyclic thioester added to the polyolefin may vary within wide limits, but preferably is from about 0.02% to 2% based on the weight of the polyolefin.

The following examples illustrate the synthesis of heterocyclic thioesters and their use for the stabilization of polyolefins.

EXAMPLE 1

A solution consisting of 1 g. of sodium in 30 cc. of methanol is slowly added with stirring to a suspension consisting of 200 g. of carbazole in 1000 cc. of acrylonitrile cooled to 0° C.

The temperature is raised until the cyanoethylation reaction is initiated, which occurs with the evolution of heat.

The temperature is maintained such that it does not exceed 50° C. The mixture is cooled and kept for half an hour at room temperature and then it is heated slowly for one hour and under reflux.

By cooling, yellow-red needles are obtained which are filtered, washed with acetone and dried.

Yield=135 g. (60% of the theoretical value). 114 g. of the crude nitrile thus obtained are maintained under reflux for 30 hours together with 2300 cc. of 5% ethyl alcohol soda.

After cooling, the solution is filtered and the filtrate is concentrated to about 1 liter.

The filtrate is acidified with 2 Normal HCl while cooling from the outside until acid to Congo Red indicator.

The solution is left for one night and the solid thus formed is then filtered, and then washed with a small amount of alcohol.

The dried yellow solid carbazolepropionic acid weighs 102 g. (85% of theoretical); M.P. 165–168° C.

The solid is crystallized from benzene by decoloring with active coal: white crystals are obtained having a melting point of 168–171° C.

Into a 2000 cc. flask are introduced: 110 cc. of toluene, 29 g. of carbazolepropionic acid, 6 g. of distilled thiodiethylene glycol. The mixture is heated under reflux in an apparatus which permits the removal of the water formed in the reaction (Markusson apparatus) to permit complete conversion transformation of the thioalcohol and acid into thioester.

0.16 g. of p-toluenesulphonic acid are then added.

The heating is continued until 1.75 cc. of water are removed, which occurs over a period of about 8 hours.

A great part of toluene is distilled under normal pressure, and then the remainder is removed under reduced pressure (residual pressure 20–30 mm. Hg).

The thiodiglycol of [β-(9-carbazolyl)propionate] thus formed (13.5 g.) is crystallized from a mixture of 50/50 ethyl alcohol/benzene.

The product is in the form of white crystals which have a melting point of 85–100° C.

By analysis the following results were obtained:

Calculated for $C_{34}H_{32}O_4N_2S$: C=72.60; H=5.71; N=4.96; S=5.69. Found: C=72.4; H=5.6; N=4.75; S=5.87.

The molecular weight, determined by the ebullioscopic method from benzene, is 559; the calculated molecular weight is 564.

The saponification number found was 198; calculated, 199.

Figure 2:
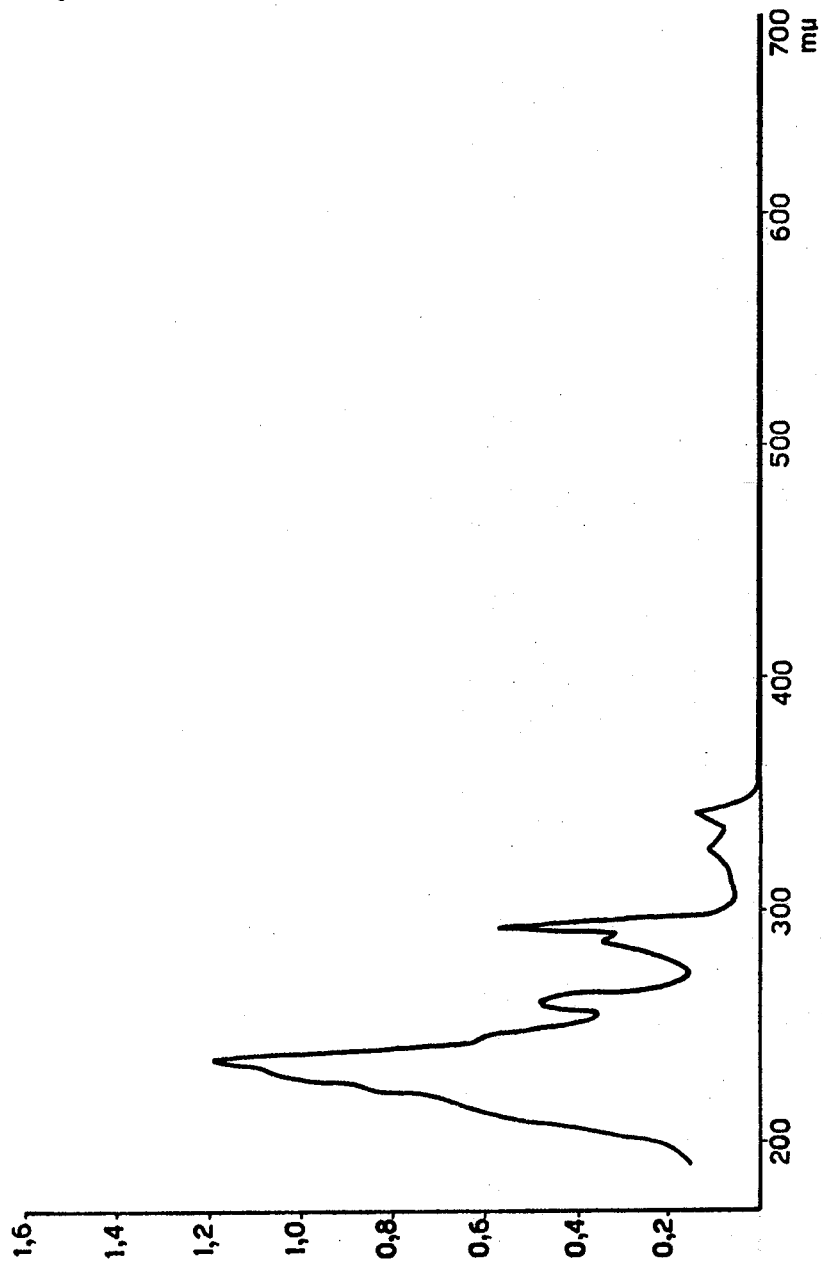

FIGURES 1 and 2 show, respectively, the infrared and ultraviolet spectra for the compound.

EXAMPLE 2

N-hydroxyethylcarbazole is prepared according to the method of Otsuki, Okano and Takedo (J. Soc. Chem. Ind., Japan, 49, 169 (1946)).

152 g. of KOH and 503 g. of carbazole are melted in an iron crucible at 230°–270° C. for two and a half hours.

The mixture is cooled under vacuum in a drier.

511 g. of a brown solid are obtained.

The potassium carbazole thus obtained is ground and dispersed in 620 cc. of xylene. Slowly (during 3 and a half hours) a solution of 113 g. of liquid ethylene oxide in 437 cc. of cold xylene is added while stirring. The mixture is slowly heated to 50° C. and is kept under agitation for an additional 4 hours. 200 cc. of water are added in order to decompose the alcoholate. The mixture is stirred and filtered, and a dark brown liquid is obtained.

After having eliminated the solvent by distillation under normal pressure, the residual liquid is distilled under 3 mm. Hg.

125 g. (24% of the theoretical value) of a brown liquid which tends to solidify are obtained at a range of 205 to 211° C.

42 g. of crude ethylolcarbazole from the preceding preparation, 11.7 g. of thiodipropionic acid, 0.5 g. of p-toluensulphonic acid and 60 cc. of toluene are kept under reflux for 6 hours in a Markusson apparatus until 80% of the calculated water is collected.

After cooling, the toluene solution is washed with 2 Normal $Na_2CO_3$ and then with water and is dried with anhydrous $Na_2CO_3$.

The solution is concentrated up to a small volume. After 2 days, a white solid precipitates (carbazole), which precipitate is filtered.

Ethyl alcohol is added to the filtrate and, after two days, a rubbery white solid is obtained which is crystallized from a 1:1 mixture of alcohol and benzene.

The complete crystallization is obtained only after several days. 6.3 g. of a white solid (20% of the theoretical value) melting at 103–105° C. are obtained.

By analysis the following results were obtained:

Calculated for $C_{34}H_{32}O_4N_2S$: C=72.60; H=5.71; N=4.96; S=5.69. Found: C=72.3; H=5.6; N=4.6; S=5.8.

The molecular weight, determined by the ebullioscopic method from benzene, was 561; the calculated molecular weight was 564.

The saponification number found was 198; calculated, 199.

Figure 3:
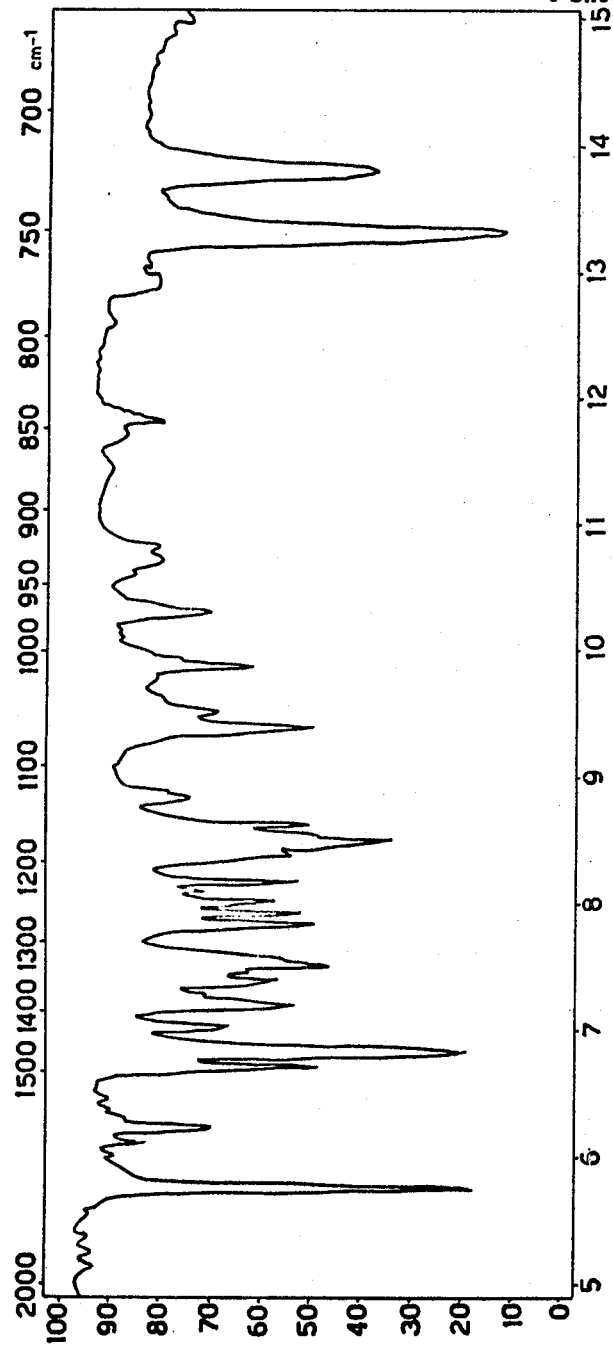
Figure 4:
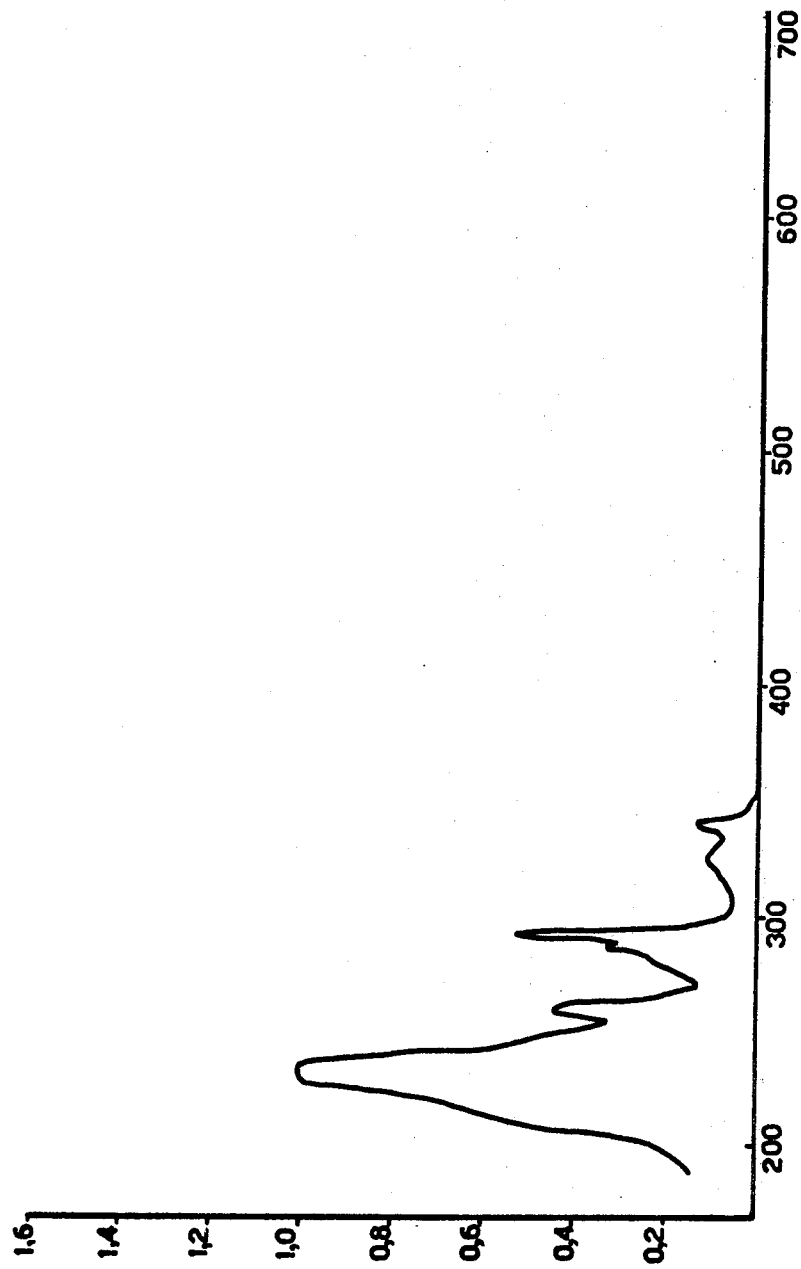

FIGURES 3 and 4 show, respectively, the infrared and ultraviolet spectra for the compound.

The ultraviolet spectra, both for the compound of Example 1 and for the compound of Example 2, were determined in cyclohexane solution, with a ratio of 1:100,000.

EXAMPLES 3 TO 6

In these examples are reported the tests for the thermal degradation (a), fastness to accelerated thermal ageing (b), and stability to sun light (c), for a composition to which a stabilizer according to the present invention was added (Examples 3, 4 and 5) and for comparison, for an unstabilized composition (Example 6).

|  | Ex. 3 | Ex. 4 | Ex. 5 | Ex. 6 |
|---|---|---|---|---|
| Composition Mixture: |  |  |  |  |
| (a) Polypropylene: |  |  |  |  |
| Intrinsic Viscosity [η] | 1.43 | 1.43 | 1.43 | 1.43 |
| Ash, percent | 0.05 | 0.05 | 0.05 | 0.05 |
| Residue after boiling heptane extraction, percent | 97.5 | 97.5 | 97.5 | 9.75 |
| (b) Calcium stearate, percent (based on weight of polypropylene) |  | 0.3 |  |  |
| Thiodiglycol of [β-(9-carbazolyl)propionate] | 0.5 | 0.5 |  |  |
| N-β-hydroxyethylcarbazole thiodipropionate |  |  | 0.5 |  |
| Lauryl thiodipropionate |  | 0.5 |  |  |
| 4,4′thiobis-6-tert-butyl-metacresol |  | 0.2 |  |  |
| Mix technology |  | Henschel mixer |  |  |
| Melt of the mix in glass tube, at 250° C. for 10 minutes; color | Clear | Clear | Clear | Clear |
| Spinning conditions: |  |  |  |  |
| Screw feeder temperature, °C | 200 | 200 | 200 | 200 |
| Extrusion head temperature, °C | 220 | 220 | 220 | 220 |
| Spinneret temperature, °C | 210 | 210 | 210 | 210 |
| Spinneret type | 60/0.8 x 16 | 60/0.8 x 16 | 60/0.8 x 16 | 60/0.8 x 16 |
| Maximum pressure (kg./cm.²) | 47 | 45 | 45 | 48 |
| Winding rate (meters/min.) | 400 | 400 | 400 | 400 |
| Stretching conditions: |  |  |  |  |
| Temperature, °C | 130 | 130 | 130 | 130 |
| Medium | Steam | Steam | Steam | Steam |
| Drawing ratio | 1:5 | 1:5 | 1:5 | 1:5 |
| Characteristics of the stretched yarn: |  |  |  |  |
| Tenacity (g./den.) | 5.3 | 5.5 | 5.5 | 5.6 |
| Elongation (percent) | 24 | 22 | 26 | 25 |
| (a) Thermal degradation (percent decrease of [η] during extrusion) | 80 | 68 | 71 | 61 |
| (b) Stability to accelerated thermal ageing (percent residual tenacity after exposure at 120° C. for 15 hours in oven with air circulation) | 95 | 98 | 92 | Brittle |
| (c) Stability to sunlight (percent residual tenacity after exposure to summer sun for 290 hours of effective exposure) | 44 | 53 | 47 | 29 |

[1] Determined in tetrahydronaphthalene at 135° C.

The crystalline polyolefins described herein are well known and consist prevailingly (over 50%) of isotactic macromolecules.

Variations can of course be made without departing from the spirit of our invention.

Having thus described our invention, what we desire to secure and hereby claim by Letters Patent is:

A heterocylic thioester selected from the group consisting of thioester of the formula

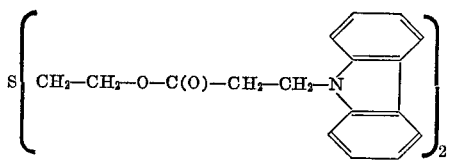

and the thioester of the formula

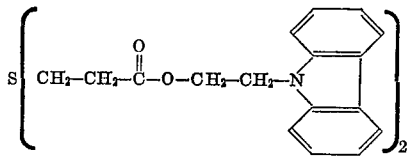

References Cited

UNITED STATES PATENTS

| | | | |
|---|---|---|---|
| 2,519,755 | 10/1950 | Gribbins | 260—45.85 |
| 2,968,557 | 1/1961 | Burgardt et al. | 260—315 |

FOREIGN PATENTS

| | | |
|---|---|---|
| 620,733 | 3/1949 | Great Britain. |

OTHER REFERENCES

Fieser and Fieser: "Organic Chemistry," 3rd ed., pp. 174–175 (1956).

Lowy et al.: "An Introduction to Organic Chemistry," 7th ed., November 1954, pp. 116–118, John Wiley & Sons, Inc., New York, Chapman & Hall, Ltd., London.

WALTER A. MODANCE, *Primary Examiner.*

A. J. McNULTY, ROBERT T. BOND,
*Assistant Examiners.*